United States Patent [19]

Newnan

[11] Patent Number: 5,195,422
[45] Date of Patent: Mar. 23, 1993

[54] HOT WATER BATCH DELIVERY SYSTEM FOR A BEVERAGE BREWING APPARATUS

[75] Inventor: Brian D. Newnan, Louisville, Ky.

[73] Assignee: Grindmaster Corporation, Louisville, Ky.

[21] Appl. No.: 864,525

[22] Filed: Apr. 7, 1992

Related U.S. Application Data

[63] Continuation of Ser. No. 594,165, Oct. 9, 1990, abandoned.

[51] Int. Cl.$^5$ .............................................. A47J 31/40
[52] U.S. Cl. ...................................... 99/283; 99/299; 99/300
[58] Field of Search ............... 99/275, 279, 280, 281, 99/282, 283, 295, 299, 300, 302 R, 304, 307; 426/433

[56] References Cited

U.S. PATENT DOCUMENTS

| | | | |
|---|---|---|---|
| 2,641,992 | 6/1953 | Clemens | 99/282 |
| 2,711,750 | 6/1955 | Norcross | 99/283 |
| 3,338,153 | 8/1967 | Holstein et al. | 99/289 |
| 3,446,937 | 5/1969 | Hugentobler | 99/281 |
| 3,596,588 | 8/1971 | Moss | 99/302 R |
| 3,727,541 | 4/1973 | Krueger | 99/307 |
| 3,824,914 | 7/1974 | Casiano | 99/302 R |
| 4,641,012 | 2/1987 | Roberts | 99/281 |
| 4,703,686 | 11/1987 | Siegfried | 99/300 |
| 4,809,594 | 3/1989 | Vitous | 99/280 |
| 4,825,758 | 5/1989 | Snowball et al. | 99/283 |
| 4,917,005 | 4/1990 | Knepler | 99/280 |
| 5,044,261 | 9/1991 | Kawazoe | 99/280 |

FOREIGN PATENT DOCUMENTS

| | | | |
|---|---|---|---|
| 2647342 | 4/1978 | Fed. Rep. of Germany | 99/300 |
| 0607460 | 8/1960 | Italy | 99/283 |

*Primary Examiner*—Harvey C. Hornsby
*Assistant Examiner*—James F. Hook
*Attorney, Agent, or Firm*—Vance A. Smith

[57] ABSTRACT

A system for automatically delivering one or more precise volumes of hot water to a beverage brewer for brewing a precise amount of a beverage and also permitting variable volumes of hot water, ordinarily in conventional cup sizes, to be manually obtained, is disclosed. The system employs single resistance probe sensor circuit and control circuit in combination with a latch circuit relay to maintain one level of hot water in a heated water tank for manual draw off of variable amounts of hot water from a faucet and for displacing the hot water in the tank from the one level to a second higher level for delivery of a predetermined portion of the displaced volume of hot water to a brewing funnel for brewing a precise volume of hot beverage upon command. A selector switch permits selection of different precise volume of hot water to be delivered to the beverage brewer upon command. A washer containing a threaded collar thereon formed of an electrical insulation material is disposed on the resistance probes of the system to prevent condensate moisture from bridging from the probes to the electrically conductive tank lid to which they are mechanically fastened to cause failure of the probe control circuit.

13 Claims, 1 Drawing Sheet

5,195,422

HOT WATER BATCH DELIVERY SYSTEM FOR A BEVERAGE BREWING APPARATUS

This is a continuation of application Ser. No. 07/594,165 filed Oct. 10, 1990, now abandoned.

BACKGROUND OF THE INVENTION

This invention relates to an electro-mechanical system for automatically delivering a precise volume of hot water from a heated water tank to a beverage brewer such as a coffee-brewer, upon command, and also permitting variable portions of hot water to be manually drawn from the tank by means of a faucet.

Generally speaking, systems of this type have been known in the prior art. See for example U.S. Pat. No. 4,464,981 issued to K. W. Stover on Aug. 14, 1984 which discloses a system for automatically delivering a batch of hot water from a hot water tank to a brewing funnel and also permits variable quantities of hot water, usually in cup sizes, to be manually withdrawn from the tank. The Stover system delivers a batch of hot water to a brewing funnel by using a timer to control the operation of a solenoid valve which delivers unheated water from a suitable remote source to a lower end of a heated tank such that the cooler unheated water flowing into the bottom of the tank displaces less dense heated water already in the tank upwardly for draw off to a brewing funnel. In addition, the Stover system employs a faucet on the heated tank which permits varying amounts of hot water to be manually drawn and the minimum level of water permitted in the tank is sensed and controlled by a resistance probe sensor and control circuit.

A problem that arises in the Stover system is due to the fact that a timer is used to control the solenoid valve which supplies source water to the tank, which timer thus controls the amount or volume of hot water displaced upwardly in the tank for delivery to the brewing funnel. Where the source water pressure varies, the amount of source water delivered by the solenoid valve to the tank in a given amount of time can vary. This, in turn, causes the amount of upwardly displaced hot water to be drawn to the brewing funnel to vary from one batch to another, which alters the strength of the beverage being brewed from one batch to another. It is therefore not accurate to state that the Stover system always delivers a precise volume of hot water to a brewer.

By means of invention, so long as the source water pressure is at least sufficient to operate and open a conventional dump valve, this difficulty as well as others encountered in the prior art is essentially overcome.

SUMMARY OF THE INVENTION

It is an object of my invention to provide a system for delivery of a predetermined volume of hot water from a heated water holding tank to a beverage brewer.

It is another object of my invention to provide a system which permits both the selected withdrawal of varying desired amounts of hot water from a heated water holding tank for making varying amounts of a hot beverage and the delivery of a pre-determined volume of hot water from the heated water holding tank to a beverage brewer to make a precise volume of a hot beverage.

It is yet another object of my invention to provide a system for both the manual delivery of hot water from a heated water holding tank to make varying amounts of a hot beverage as desired and the automatic delivery of a preselected volume of hot water from the tank to a beverage brewer.

Briefly, in accordance with my invention, I provide a system for delivering a predetermined volume of hot water from a heated water holding tank to a beverage brewer. The system includes first means for sensing when hot water in the tank is below a first predetermined level and means responsive to said first means for supplying water from a remote source to the tank to be heated and for raising the level of hot water in the tank to the first level. Also included is means for selectively raising the hot water in the tank from any level to a second preselected level which is spaced above the first level and second means for sensing when the hot water in the tank rises to the second level. The system also includes means responsive to the second means for withdrawing hot water from the tank from an intermediate level between the first and second levels for delivery to a beverage brewer and for lowering the level of hot water in the tank from the second to the intermediate level.

These and other objects, features and advantages of my invention will become apparent to those skilled in the art from the following detailed description and attached drawings upon which, by way of specific example, only a preferred embodiment of my invention is illustrated.

DESCRIPTION OF THE PREFERRED EMBODIMENT

Figure 1:
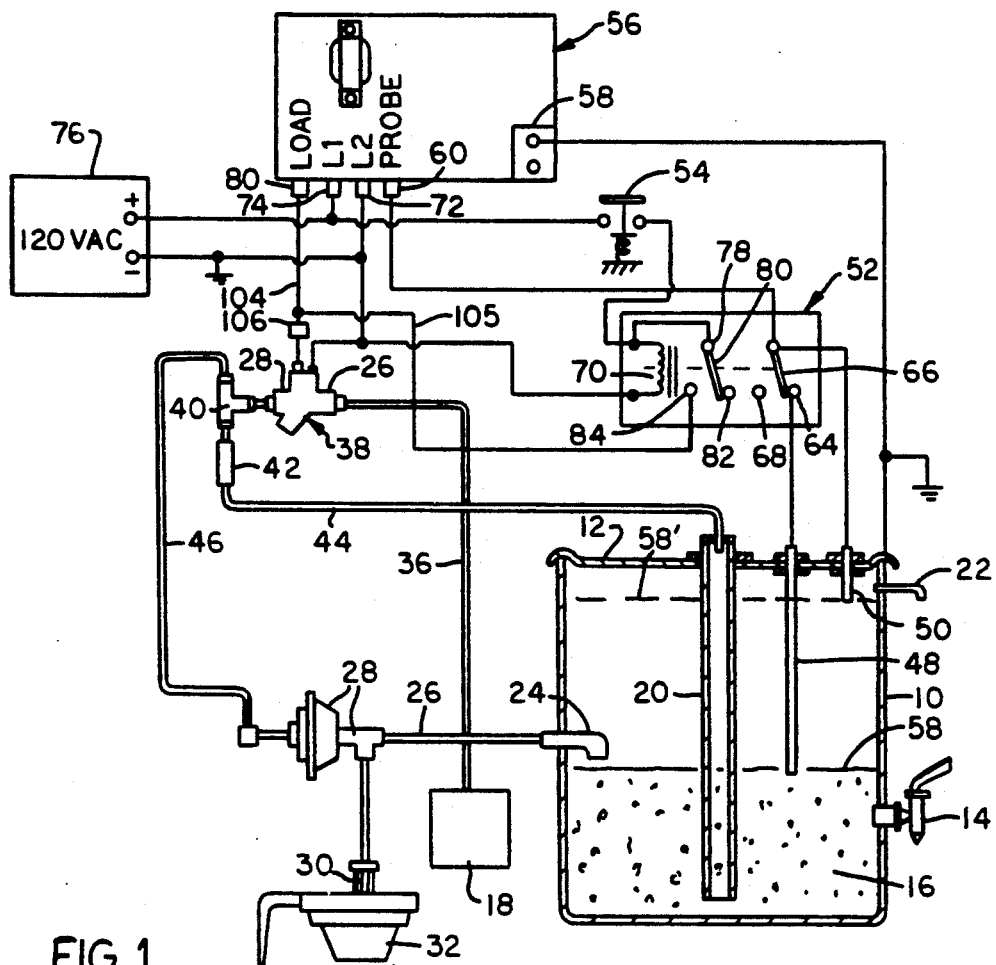
FIG. 1 shows, schematically, an electrical water level sensing and control circuit and a water flow circuit for a heated water holding tank of a coffee brewing system, thus illustrating a preferred embodiment of my invention.

Referring now to the drawing figures and, in particular, to FIG. 1, there is shown a conventional heated water tank 10 of any type suitable for use in a coffee brewing system. The tank 10 may be constructed of stainless steel and includes a removable stainless steel cover 12. A manually operable faucet or tap 14 is provided to permit removal of selected amounts of hot water 16 from the tank 10 as, for example, when preparing one or more individual cups of a hot beverage such as coffee, tea, cocoa or the like. The tank 10 may be heated in any suitable manner so as to raise and maintain the temperature of a quantity of water 16 therein, as supplied from a conventional commercial or other suitable water source 18, to a level satisfactory for hot beverage drinking purposes, preferably in the neighborhood of 185° F. Unheated water is supplied from the source 18 ultimately to a lower end portion of the tank 10 through a relatively large diameter, vertically extending inlet tube 20 which is rigidly attached on an upper end portion thereof to the cover 12 so as to be removable from the tank 10 when the cover 12 is removed as, for example, when being cleaned. A suitable air vent 22 is attached to an upper end portion of the tank 10 and communicates with the interior thereof above the highest water level to be permitted to allow the tank interior to breathe with the cover 12 in place as shown, so as to facilitate changes in the water level.

The circuit associated with the tank 10 is used to provide, upon command, a precise quantity of hot water through a siphon 24, water line 26 and a conventional, normally open, diaphragm operated dump valve 28 to a diffuser or spray nozzle 30, thence to a standard coffee brewing funnel or cone 32 so as to deliver a precise volume of hot brewed coffee by gravity flow to a coffee decanter or pot 34 of at least the same volume as the volume of the water being delivered. Water is delivered from the source 18 through a water line 36 to an input port of a suitable electrically operated, normally closed, solenoid valve 38. When the valve 38 is open, source water flows therethrough into a tee 40 and, from one side of the tee 40, through a flow restrictor 42 and water line 44 into the tank inlet tube 20 and tank 10. During periods when the valve 38 is open to supply source water to the tank 10, a high water pressure exists in a water line 46 connected between the other side of the tee 40 and a pressure bell of the dump valve 28 due to action of the flow restrictor 42, whereby the dump valve 28 is maintained in a closed condition to prevent hot water from flowing out of the tank 10 through the siphon 24. Conversely, when the valve 38 closes to shut off the flow of source water to the tank 10, the high pressure in the line 46 drops as water from the line 46 bleeds back through the tee 40 and flow restrictor 42 into the line 44. When the pressure in the line 46 drops sufficiently, preferably below about 6 psi depending upon the setting of the dump valve 28, the latter opens to its normal state as the diaphragm contracts under the influence of a spring bias, to allow the siphon 24 to communicate with the spray nozzle 30. Source water in the line 46 is isolated from the spray nozzle 30 at all times by the diaphragm of the dump valve 28.

The electrical control circuit of FIG. 1 includes a pair of conventional, electrically operated resistance sensing probes 48 and 50, mechanically attached to but electrically insulated from the tank cover 12, a double pole/double throw latching relay 52, a normally open, spring return, push button start switch 54, and a time delay, probe resistance sensor and relay and solenoid valve control circuit 56. The probe 48 is used to sense the presence of water 16 in the tank 10 at a lowest permissible level 58 and will be referred to as the low probe. It is from this level 58 that hot water is drawn from the faucet 14. The probe 50 is used to sense the presence of water 16 at a highest permissible level 58' and will be referred to as the high probe. It is from this level 58' down to the level at which action of the siphon 24 is broken that hot water is drawn to make a precise volume of coffee in the brew cone 32 for delivery to the pot 34. It is important that the lower end of the low probe 48 be positioned sufficiently below the lowest level at which the siphon 24 is operative to draw water from the tank 10 so that the low probe 48 will never be out of contact with the water at a level where the siphon 24 is operative. In practice I have found that the lower tip of the probe 48 should be at least one-eight of an inch below the lower edge of the cup of the siphon 24 which is below the level at which surface tension and surface ripple can cause the siphon 24 to continue drawing water after the water has dropped from a level above the siphon 24. The lower tip of the probe 48 may need to be lower still in the event the tank 10 is not level such that the lower edge of the siphon 24 is equal to or below the level at which the tip of the low probe 48 can become unwetted. The high probe 50 should have its lower tip positioned below the air vent 22 to establish the highest permissible water level 58' such that the difference between the level at which action of the siphon 24 is broken and the level 58' represents the precise volume of hot water 16 in the tank 10 needed to brew the desired amount of coffee in the cone 32 for delivery to the pot 34 in one continuous operation. Ordinarily, this means that the difference in these levels should be such that the volume of hot water 16 between these levels is sufficient to fill the pot 34 with brewed coffee. On the other hand, the levels can be adjusted such that the volume of hot water between these levels is sufficient for delivery of hot coffee in any desired fraction of the volume of the pot 34 as desired so long as the level 58' is at least high enough to start the siphon 24 and so long as the low probe 48 does not become unwetted before operation of the siphon 24 ceases as aforesaid.

The sensing and control circuit 56 of the present example is a standard component such as that manufactured by National Controls Corporation as Part No. LNC-NS156-120 or the equivalent. Such a control circuit 56 is operable with a conventional 120 v.a.c., 60 Hz electrical source and contains an RC time delay circuit which provides a 5 second delay before a component such as the solenoid valve 38 and latching relay 52 can be energized as measured from the time of receipt of a triggering signal from a resistance probe such as the probe 48. I find this delay to be more than necessary in a coffee brewing system and, therefore, recommend changing the time constant of the RC time delay circuit so as to reduce the delay time to about one second or any other time delay sufficient to permit a complete change of state of the relay 52. This is readily accomplished by changing either the resistance or capacitance, or both, of the RC time delay circuit of the control circuit 56 such that the product of the resistance value and the capacitance value is equal to about one second. With this suggested modification, a ground terminal 58 of the circuit 56 is electrically connected to the metal tank cover 12, a PROBE terminal 60 thereof is connected to a common terminal 62 of one of the double pole/double throw switches 64 of the relay 52, and a normally closed terminal 66 of the switch 64 is connected to the low probe 48. A normally open terminal 68 of the switch 64 is left unconnected and the high probe 50 is electrically connected to the common terminal 62. Thus, it will be seen that the high probe 50 is always directly connected to the PROBE terminal 60 of the sensing and control circuit 56, while the low probe 48 is only connected to the PROBE terminal 60 when the relay 52 is in a de-energized condition as shown in FIG. 1.

A relay coil 70 of the relay 52 is connected on one side thereof to an L2 terminal 72 of the control circuit 56 and on the other side thereof through the normally open start switch 54 to an L1 terminal 74 of the control circuit 56, the terminal 74 also being directly connected to a 120 v.a.c., 60 Hz power source 76 and the terminal 72 also being connected to ground. The side of the coil 70 connected to the start switch 54 is also connected to a common terminal 78 of the other relay switch 80, a normally closed terminal 82 of which is left unconnected and a normally open terminal 84 of which is connected to a LOAD terminal 86 of the control circuit 56 to provide a latch for keeping the relay coil 70 energized after the start switch 54 has been momentarily depressed (long enough to cause the switch 80 to change state) and returned to its normally open state so long as relay coil energizing potential remains on the LOAD terminal 86. The LOAD and L2 terminals 86 and 72, respectively, are also connected to the solenoid valve 38.

The following table shows various commercially available components suitable for use in the system of FIG. 1.

| ITEM | DESCRIPTION |
| --- | --- |
| Sensing and Control Circuit 56 | National Controls Corporation, Part No. LNC-NS156-120 |
| Relay 52 | 120 v.a.c., 60 Hz double pole/double throw |
| Solenoid Valve 38 | The Horton Company Model No. S-45 |
| Dump Valve 28 | Grindmaster Corporation d/b/a Reynolds, Part No. 12055 |
| Resistance Sensing Probes 48, 50, 98, 100 and 102 | National Controls Corporation, Part Nos. LLP-06.00-0SS, LLP-12.00-0SS, LLP-24.00-0SS with probe lengths cut to desired lengths as necessary |
| Probe Holder for mounting on the lid 12 | National Controls Corporation, Part No. LLH-01138-010 |

The system of FIG. 1 operates as follows. Initially assume the tank 10 is empty, the power source 76 is connected to the sensing and control circuit 56 as previously explained, and the start switch 54 is open. Under such initial conditions, the low probe 48 is connected through the switch 66 of the de-energized relay 52 to the PROBE terminal 60 of the circuit 56 and presents a high resistance to the circuit 56, indicative of the water 16 in the tank 10 being below the lowest permissible level 58. After a time period of about one second from the start of this sensed condition, a relay in the circuit 56 applies a 120 v.a.c. potential to the terminal 86 thereof to energize and thus open the normally closed solenoid water valve 38, whereby water is supplied from the source 18 to the tank 10 and into the water line 46 to close the normally open dump valve 28 due to high water pressure in the line 46 produced by the flow restrictor 42. As the water level in the tank 10 rises into contact with the tip of the low probe 48, thus obtaining the lowest permissible water level 58, the low probe 48 begins to conduct an electrical signal through the water 16 to the tank 10, which is at ground potential, whereby the resistance of the probe 48, as sensed at the PROBE terminal 60, decreases sharply. This causes the circuit 56 to react by de-energizing the valve 38 to shut off the flow of water from the source 18 to the tank 10, whereby water leaks back from the dump valve 28 through the line 46, tee 40 and restrictor 42 into the water line 44 to cause the dump valve 28 to open. However, since the tip of the low probe 48 is below the level of the siphon 24, water will not be drawn from the tank 10 to the spray nozzle 30 by reason of this operation. The faucet 14 may be used to draw various quantitites of the hot water 16 from the tank 10 as desired, the circuit 56 thereafter energizing the solenoid valve 38 to also close the dump valve 28 each time the water level drops below the lower tip of the low probe 48 to bring the level of the water 16 back to the level 58.

Now, to obtain a precise batch or volume of hot water from the tank 10 to brew a precise volume of hot coffee and deliver the same to the pot 34, the start switch 54 is depressed for a length of time sufficient to energize the relay coil 70 and disengage both of the relay switches 66 and 80 from their normally closed contacts 64 and 82, respectively, and bring them into contact with their normally open contacts 68 and 84, respectively. This action by the relay switch 80 latches the 120 v.a.c. power source 76 directly from the LOAD and L2 terminals 86 and 72, respectively, of the circuit 56 across the coil 70, thus by-passing the normally open start switch 54 to keep the coil 70 energized so long as an energizing potential remains between the L2 and LOAD terminals 72 and 86, respectively, and even though the start switch 54 has opened after being released. This action by the switch 66 also removes the low probe 48 from contact with the PROBE terminal 60 leaving only the high probe 50 so connected.

Accordingly, the valve 28 is energized, the dump valve 38 is closed and the water level in the tank 10 rises until it contacts the tip of the high probe 50 at the maximum permissible water level 58'. The high probe 50 thus begins to conduct, whereby its resistance as sensed at the PROBE terminal 60 sharply decreases, causing the circuit 56 to de-energize the LOAD terminal 86 to thus de-energize valve 38 and the relay 52 and open the dump valve 28. Now with the water level at 58', well above the inlet to the siphon 24, the open dump valve 28 allows hot water to flow from the tank 10 through the line 26, valve 28, and spray nozzle 30. During this process, even though the level of water 16 has dropped below the probe 50 to increase its resistance as sensed at the PROBE terminal 60, a high water level in the tank 10 keeps the low probe 48 wet and thus conductive which, in turn, maintains the valve 38 and latching relay 52 de-energized and the dump valve 28 open until the water level drops to the level where suction action of the siphon 24 is broken. However, since the low probe 48 remains in contact with the water when the suction action is broken, the relay 52 remains in a de-energized state.

Ultimately, the desired volume of water is siphoned from the tank 10 to bring the water level to the cutoff level of siphon 24 such that the pot 34 has received the desired quantity of brewed coffee and such that the system reaches a quiescent state. The system stays in this condition until either the start switch 54 is again depressed to raise the water level to 58' preparatory to brewing another pot of coffee or until the water 16 in the tank 10, either by evaporation or draw-off through the faucet 14, falls below the probe 48 to again energize the water valve 38 and shut the dump valve 28 to refill the tank 10 to the level 58.

Figure 2:
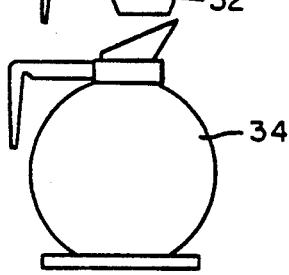
FIG. 2 shows a cross-sectional elevation veiw of a fragment of an electrical resistance sensing probe assembly attached to a lid of a wat4er holding tank illustrating means for preventing electrical shorting of the probe to the tank lid, thus illustrating one of the additional features of my invention.

Referring now to FIG. 2, there is shown a conventional resistance sensing probe 88 of any type suitable for use in the circuit of FIG. 1 as the high or low probes 48 or 50, assuming the probe length to be properly selected. The probe 88 extends through a metal tank cover 90, similar to cover 12 of the previous example, and is rigidly fastened thereto while being electrically insulated therefrom. A sheath 92 of electrical insulation material covers an upper portion of the probe 88 and a combination flat washer and threaded collar 94, also constructed of electrical insulation material, is affixed to an upper end portion of the probe 88 just below the cover 90 such that the threaded collar extends through a hole in the plate 90 and is held in place by a nut 95. The diameter of the washer 94 should be at least one-half inch. I have found that the use of the sheath 92 and washer 94 in this manner minimizes the possibility of condensate forming a continuous electrically conductive path along the underside and over the periphery of the washer 94 to bridge along the sheath 92 and cause electrical shorting of the probe 88 to the metal cover 90. Should such shorting occur on the low probe 48 of FIG. 1, for example, when the relay 56 has been in a de-energized state, the circuit 56 could not recognize when the level of water 16 in the tank 10 had dropped below the lowest permissible level 58 and would not react to energize the solenoid valve 38 to cure the condition. If such shorting occurred between the high probe 50 and the tank cover 12 of FIG. 1, the circuit 56 would react as though a batch brewing operation is in progress, even though such a process is not occurring, such that an actual brewing operation could not be initiated.

Figure 3:
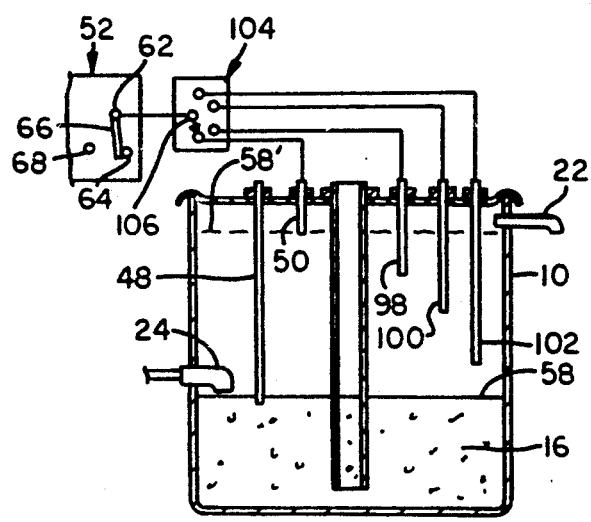
FIG. 3 shows a cross-sectional elevation view of a heated water holding tank of a coffee brewer, identical to the tank of FIG. 1 illustrating, schematically, switching means for selecting any one of several electrical resistance probes for use in selecting between several different precise volumes of hot water to be delivered from the tank to a beverage brewer, thus illustrating a further additional feature of my invention.

Referring now also to FIG. 3, there is shown a multiple high probe arrangement for use in the system of FIG. 1 for permitting the user to select between four different precise volumes of hot water to be delivered from the tank 10 through the siphon 24 to the brewing cone 32 (FIG. 1 only) for brewing any of four different quantities of hot coffee. In FIG. 3, numbers similar to the numbers used in FIG. 1 refer to the identical elements. In this arrangement, the tank 10 contains the low probe 48, the high probe 50 and three additional probes 98, 100 and 102, the latter four probes being positioned at four different levels in the tank 10 above the low probe 48. The water 16 is shown in this example at the low probe level 58, the same as in FIG. 1. A 4-position selector switch 104 is employed with its common switch terminal 106 connected directly to the common terminal 62 of the relay switch 64 and with each of its four selectable switch terminals is connected to a different one of the probes 50, 98, 100 and 102. The difference in heights between the lower tip of the low probe 48 and that of each of the various high probes 50, 98, 100 and 102 should be adjusted to provide the four different volumes of hot water to be selected for delivery to the brewer. The remainder of the electrical and water flow circuit of FIG. 3 is identical with that of FIG. 1. Accordingly, by choosing with the selector switch 104 any one of the high probes 50, 98, 100 or 102, before pressing the start switch 54 of FIG. 1, any one of four different precise volumes of hot water can be delivered to the brewing cone 32 of FIG. 1 during the brewing operation. In this manner, any number of high probes can be used with the system of FIG. 1 to provide any desired number of different volumes of hot water to a brewer simply by selecting the desired high probe for placement into the circuit of FIG. 1 with a selector switch before starting the hot water batch delivery process by depressing the start switch 54.

Referring again to FIG. 1, it may be found desirable to provide, means for disabling the solenoid valve 38 after a predetermined time period of continuous operation greater than the maximum time needed to raise the water level in the tank 10 to the high probe level 58' under normal circumstances. Such a time period should be selected as indicative of a failure in the control circuit 56 to shut the valve 38 upon reaching the level 58' or of an open circuit between the high probe 50 and the PROBE terminal 60 or the control circuit 56 of the like. In this way, back up protection would be afforded to keep the tank 10 from seriously overflowing due to such a defect.

This may be accomplished by opening the electrical line 106 between where the line 105 connects thereto and the solenoid valve 38 and connecting a suitable timer switch 108 therein which is normally closed but which can be set to open automatically to open the line 104 and disable the valve 38 after a desired length of time. I employ such a timer switch which is set to open at 2½ minutes after having been continuously energized. The switch timer automatically resets to zero elapse time where the line 104 becomes de-energized in less that 2½ minutes after having been energized. A suitable timer switch for this purpose is sold by National Controls Corporation as Part No. Q4F-00300-321 with an external resistance across terminals Nos. 4-5 thereof of 500K ohms.

Although the present invention has been described with respect to specific details of certain preferred embodiments, it is not intended that such details limit the scope of the present invention other than as specifically set forth in the following claims.

I claim:
1. A system for manually delivering a selected volume of hot water and a batch of hot water in a predetermined volume from a single holding tank to a beverage dispenser comprising
   (a) a hot water holding tank, said tank connected a remote source of water;
   (b) water tap means communicating with said tank below a first preselected level of water within said tank for manually removing a selected volume of water therefrom, thereby causing said water level to temporarily recede below said first preselected level;
   (c) first sensing means for sensing when the level of water in said tank is below said first preselected level;
   (d) water level control means connecting said tank to said remote source of water and raising the level in said tank back to said first preselected level in response to said first means sensing water below said first preselected level;
   (e) Means for initiating delivery a batch of hot water of a predetermined volume from said tank to said beverage dispenser, said water level control means responsive to said initiating means for connecting said tank to said remote source of water;
   (f) second sensing means for sensing when said water in said tank reaches a second predetermined level above said first level, said water level control means disconnecting said tank from said remote source of water in response to said second sensing means sensing water at said second level; and
   (g) means for connecting said tank to said beverage dispenser when reaches said second predetermined level and maintaining the connection until the water reaches an intermediate level between said first and second levels thereby delivering said batch of hot water from said tank to said beverage dispenser.

2. The system of claim 1 including time delay control means for disconnecting said tank from the remote source of water after a predetermined time period.

3. The system of claim 1 in which said water level control means comprises a selectably operable valve element positioned in a water supply line communicating with said tank and the remote water source, said selectably operable valve element being normally in a closed state.

4. The system of claim 3 in which said water level control means includes a second valve element positioned in a water removal line from said tank to said beverage basket, said second valve element being in a closed state in response to said selectably operable valve being in an open state and being biased into an open state when said second valve means is in a closed state.

5. The system of claim 4 in which said second valve element is responsive to an increase in pressure in said water supply line for changing to the closed state thereby closing said water removal line.

6. The system of claim 5 in which said water removing line communicates with said tank at about the level of said intermediate level.

7. The system of claim 1 in which said first sensing means being a conducting probe having a tip extending below said intermediate level.

8. The system of claim 7 in which said first sensing means is part of an electric circuit and is removed from said circuit by said water level control means when raising the water level to said second preselected level.

9. A system for providing precise volume of water from a holding tank to a beverage dispenser comprising
(a) a hot water holding tank;
(b) a water supply line connecting a remote source of water to said tank;
(c) a solenoid operated supply valve in said supply line biased to a closed position when de-energized;
(d) a water flow restrictor to increase the pressure in the supply line when water is flowing between the remote source of water and said tank, said restrictor positioned in said supply line between said tank and said supply valve;
(e) a water removal line connecting said tank to said beverage dispenser and means for moving a volume of water from said tank through said water removal line to said beverage dispenser, said water moving means connected to said tank at an intermediate position;
(f) a pressure sensitive valve in said water removal line and connected to said supply line between said supply line valve and said flow restrictor, said valve being closed when water is being supplied to said tank in response to water pressure in said supply line;
(g) a first sensing probe extending downwardly into said tank and terminating at a lower level beneath said intermediate level;
(h) at least one second sensing probe extending downwardly into said tank and terminating at a level above said intermediate level;
(i) water tap means connected to said tank at a position below said first sensing probe for removing water from said tank; and
(j) water level control means for generating a signal to energize said solenoid supply valve open when the water level falls below said lower level and out of contact with said first sensing probe due to removal of water from said tank by said water tap means thereby permitting water to flow through said solenoid valve into said tank from said remote water source, said water level control means generating said signal until the water returns to said lower level and contacts said first sensing probe.

10. The system of claim 9 including means for initiating the removal of water from said tank to said beverage dispenser, said control means including a control circuit and a latching relay comprising a relay coil and multiple throw switch means responsive to said relay coil when energized for electrically isolating said first sensing probe.

11. The system of claim 10 in which said initiating means is a manually operated push button switch connecting a source of electrical power to said relay means along a first electric circuit path when depressed thereby energizing said relay means.

12. The system of claim 11 in which said multiple throw latch in response to said relay means when energized connects said relay means to a source of electrical power along a second electric circuit path thereby bypassing said push button switch.

13. The system of claim 12 including a plurality of second sensing probes of different lengths extending into said tank and selecting means for placing one of said second sensing probes into electrical communication with said water level control means.

* * * * *